Figure 1:
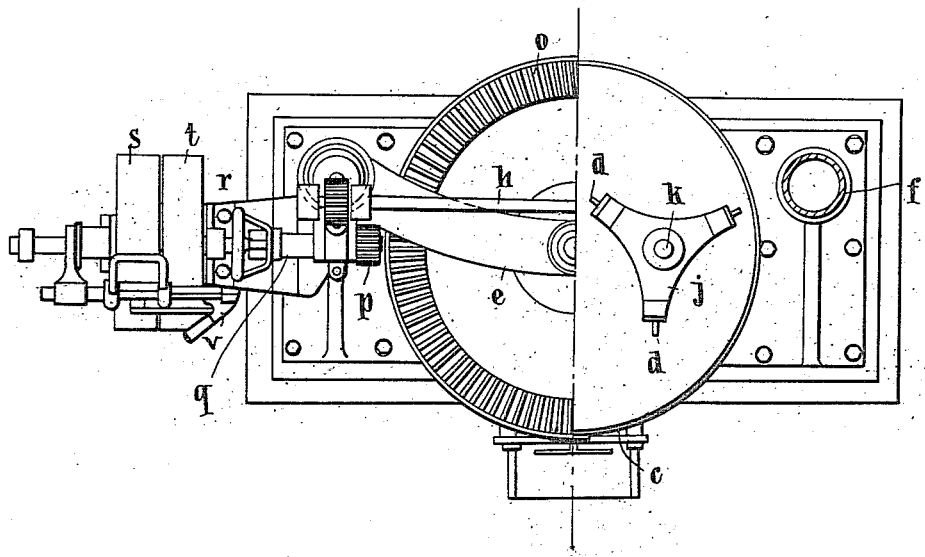

J. T. ARMSTRONG & J. MORDAN.
SOLIDIFICATION OF HYDROCARBON OILS.
APPLICATION FILED MAY 4, 1912.

1,041,564.

Patented Oct. 15, 1912.
2 SHEETS—SHEET 1.

Witnesses
Inventors
J. T. Armstrong, J. Mordan
Attorneys
Mason Fenwick & Lawrence

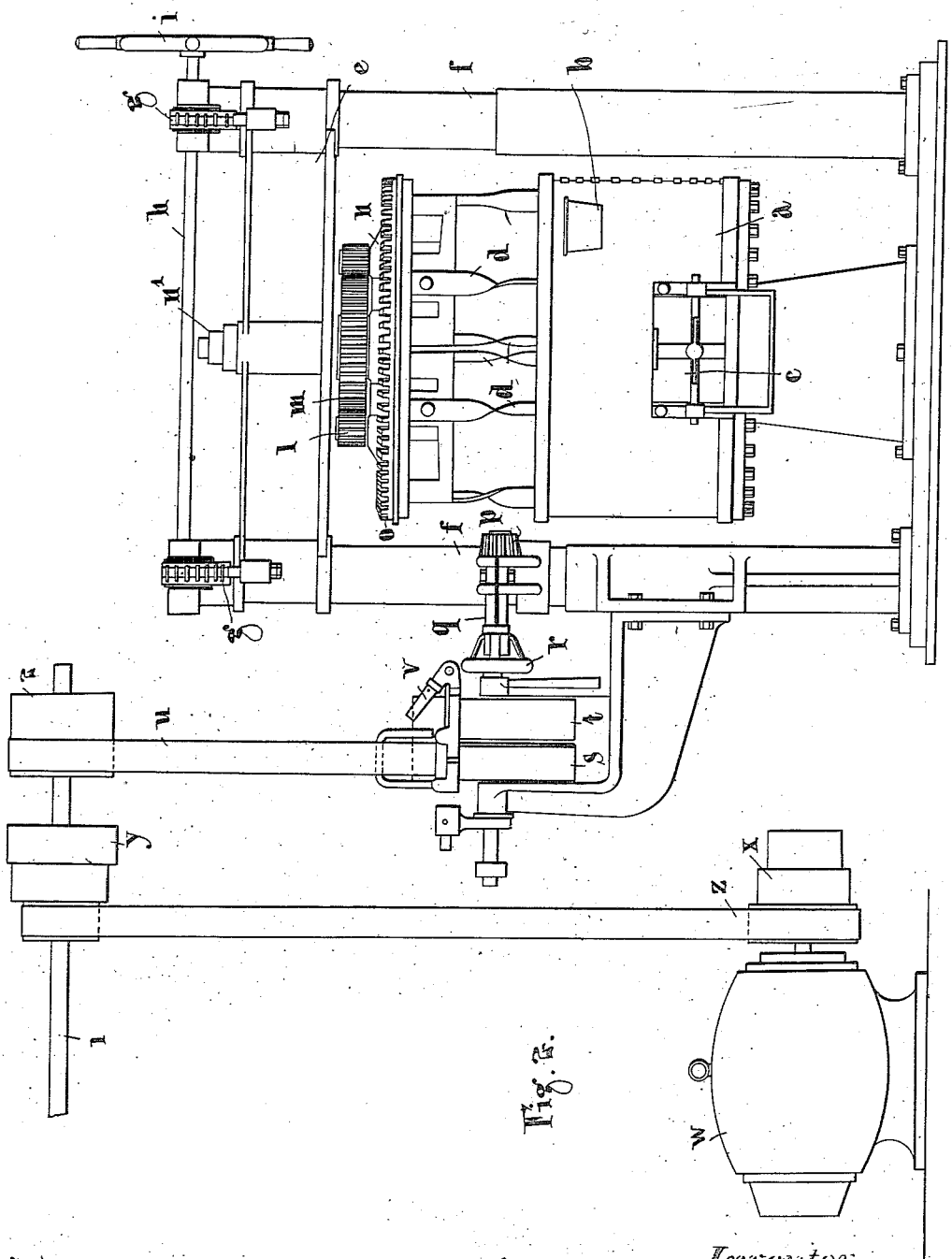

UNITED STATES PATENT OFFICE.

JAMES TARBOTTON ARMSTRONG, OF LONDON, AND JAMES MORDAN, OF HUGHENDEN, ENGLAND.

SOLIDIFICATION OF HYDROCARBON OILS.

1,041,564.   Specification of Letters Patent.   Patented Oct. 15, 1912.

Application filed May 4, 1912. Serial No. 695,142.

*To all whom it may concern:*

Be it known that we, JAMES TARBOTTON ARMSTRONG, a subject of the King of Great Britain and Ireland, and residing at 11 Southampton Row, London, W. C., England, and JAMES MORDAN, a subject of the King of Great Britain and Ireland, and residing at Walters Ash, Hughenden, in the county of Bucks, England, have invented certain new and useful Improvements in and Relating to the Solidification of Hydrocarbon Oils, of which the following is a specification.

This invention relates to the manufacture of solidified hydrocarbon oils.

There are difficulties arising in the solidification of petroleum and other hydrocarbon oils, which render their manufacture prohibitive as to cost, while the quality of the products obtained is not commercial, and the object of this invention is to provide a process by which these disadvantages are avoided.

In the manufacture of solidified hydrocarbon oils an emulsion is first produced by mixing the oil with a binding and emulsifying agent or agents and the present invention consists in producing such an emulsion in a high speed mixing apparatus and in continuing the mixing operation so long until a very fluffy product is obtained, which product may be employed after pressure or in the fluffy state for any of the uses to which solid petroleum or other hydrocarbon oils are applied but more particularly in the fluffy state for fire lighters.

According to one mode of carrying out the invention we proceed as follows:—The binding and emulsifying material, preferably glue, dissovled in an excess quantity of water which excess of water we have found renders the fluffing of the emulsion easier and more perfect is placed in a mixing apparatus which may be steam or water jacketed and which is formed with a stirrer capable of being operated at a very high speed. The stirrer comprises blades mounted on a rotary member and adapted to be rotated also around their own axis. The stirrer being put into operation, oil is gradually added to the emulsifying agent until the right proportion of oil and emulsifying agent has been attained, whereupon the sulfate of iron is added and the apparatus is run at a high speed until a perfect emulsion is produced. The speed at which we prefer to rotate the mixer in order to produce the emulsion is about 170 revolutions per minute, the blades of the mixer making about 100 revolutions per minute round their own axes. After the emulsion has been formed the running of the stirrer is continued and preferably at a higher rate of speed until a fluffy material is produced. The higher rate of speed at which we prefer to run the stirrer in order to produce the fluffy material is about 250 revolutions per minute for the mixer and about 150 revolutions per minute for the blades of the mixer round their own axes. The material thus obtained is placed or pressed into molds and after it has sufficiently hardened for handling, removed therefrom and allowed to dry.

When used in the fluffy state for fire lighters the blocks are removed from the molds and cut into slices of any desired size either before or after they are dry.

The following is an example of the proportions of the ingredients we use:—

| | |
|---|---|
| Petroleum | 68.75 |
| Glue | 5.20 |
| Water | 25.00 |
| Sulfate of iron | 1.05 |
| | 100.00 |

The accompanying drawings illustrate the mixer we prefer to use, Figure 1 being a plan view and Fig. 2 a front elevation of the same, the latter figure also showing the means for changing the speed of the mixer.

The mixer comprises a mixing casing $a$ provided with a chute $b$ for the admission of the materials to be mixed and with an opening for the delivery of the mixed materials, which opening is closed by a door $c$ during the mixing operation. The blades $d$ of the mixer are suitably supported from a cross-beam $e$ arranged to be vertically moved—in order to insert the blades into the mixing casing or remove them therefrom—and be guided on hollow supports $f$ by means of chains $g$ attached at one of their ends to the cross-beam and carrying at their other end counterweights which are moved up and down within the hollow supports, the chains $g$ being operated by chain wheels mounted on a spindle $h$ which can be rotated by a hand wheel $i$. The blades $d$ are arranged in two groups each of which is mounted on a frame $j$ (see Fig. 1) which can be turned together with the blades thereon around the axle $k$ by means of a pinion $l$ (see Fig. 2), the pinions $l$ being operated by means of a central pinion $m$; all these pinions are mounted on a support $n$ arranged to rotate on a shaft $n'$ mounted in the cross-head $e$, the support $n$ carrying the frames $j$ from which depend the blades $d$ and acting as a lid for the mixing casing $a$ when the blades are lowered into the latter by the downward movement of the crosshead $e$.

The rotation of the mixer is effected by means of a bevel gear, one member $o$ of which is formed on the support $n$ while the other member $p$ thereof is adapted to be brought into engagement with the member $o$ when the support $n$ is lowered on to the casing $a$. The bevel wheel $p$ can be axially moved on a shaft $q$ by means of a hand wheel $r$ so as to be brought into its operative or inoperative position. The shaft $q$ is also provided with a loose pulley $s$ and with a fixed pulley $t$, a belt $u$ being adapted to be moved from the one pulley on to the other by means of a lever $v$.

The driving power is derived from a suitable motor $w$ which transmits its rotation to the bevel wheel $p$ through the intermediary of the stepped pulleys $x$ and $y$, belt $z$, shaft 1, pulley 2, belt $u$, fixed pulley $t$ and shaft $q$. The bevel wheel $p$ rotates the support $n$ together with all the parts mounted thereon, whereby the pinions $l$ operate as planet wheels around the central pinion $m$ and cause each group of three blades $d$ to perform a movement separate from the movement of all the blades around the axis of the shaft $n'$. The increase in speed of the machine is obtained by shifting the belt $z$ from one member to the other of the stepped pulleys $x$ and $y$, as is well known.

Having now described our invention what we claim as new and desire to secure by Letters Patent is:

1. A process for the manufacture of solidified hydrocarbon oils consisting in mixing a hydrocarbon oil with a binding and emulsifying agent at a high speed until an emulsion is formed and continuing the mixing after the emulsion has been formed until a fluffy product is obtained, substantially as set forth.

2. A process for the manufacture of solidified hydrocarbon oils consisting in mixing a hydrocarbon oil with a binding and emulsifying agent at a high speed until an emulsion is formed and continuing the mixing after the emulsion has been formed so long and at an increased rate of speed until a fluffy product is obtained, substantially as set forth.

3. A process for the manufacture of solidified hydrocarbon oils consisting in mixing at a high speed a hydrocarbon oil with a binding and emulsifying agent dissolved in an excess quantity of water and continuing the mixing so long until a fluffy product is obtained, substantially as set forth.

4. Fire lighters consisting of solidified hydrocarbon oils in a fluffy state.

In testimony whereof we have signed our names to this specification in the presence of two subscribing witnesses.

JAMES TARBOTTON ARMSTRONG.
JAMES MORDAN.

Witnesses:
WILLIAM BRIMALL,
HERBERT BAMFORD.